United States Patent [19]
Yu

[11] Patent Number: 5,910,824
[45] Date of Patent: Jun. 8, 1999

[54] FRAME MEMORY FOR A MOTION PICTURE DECODER

[75] Inventor: Pil-ho Yu, Suwon, Rep. of Korea

[73] Assignee: Samsung Electronics Co., Ltd., Kyungki-do, Rep. of Korea

[21] Appl. No.: 08/689,070

[22] Filed: Jul. 30, 1996

[30] Foreign Application Priority Data

Jul. 31, 1995 [KR] Rep. of Korea ............... 95-23467

[51] Int. Cl.⁶ ........................ H04N 9/64; H04N 9/475; H04N 5/91

[52] U.S. Cl. .................. 348/714; 348/718; 348/699; 386/68; 345/516; 345/517; 345/203

[58] Field of Search ........................ 348/718, 714, 348/384, 409, 412, 402, 415, 416, 439, 699, 404, 403; 386/68, 33, 109, 111, 112; 345/517, 507, 516, 203

[56] References Cited

U.S. PATENT DOCUMENTS

| | | | |
|---|---|---|---|
| 5,257,141 | 10/1993 | Matsumi et al. | 386/33 |
| 5,305,113 | 4/1994 | Iwamura et al. | 358/312 |
| 5,379,351 | 1/1995 | Fandrianto et al. | 382/41 |
| 5,585,931 | 12/1996 | Juri et al. | 348/403 |
| 5,680,369 | 10/1997 | Hashimoto et al. | 365/233 |
| 5,703,646 | 12/1997 | Oda | 348/404 |
| 5,796,412 | 9/1998 | Kim | 345/517 |
| 5,812,829 | 9/1998 | Ito | 395/516 |

FOREIGN PATENT DOCUMENTS

| | | | |
|---|---|---|---|
| 0 503 956 | 9/1992 | European Pat. Off. | H04N 7/13 |
| 0 602 588 | 6/1994 | European Pat. Off. | H03N 7/13 |
| 0 664 650 | 7/1995 | European Pat. Off. | H04N 7/24 |

*Primary Examiner*—John K. Peng
*Assistant Examiner*—Wesner Sajous
*Attorney, Agent, or Firm*—Sughrue, Mion, Zinn, Macpeak & Seas, PLLC

[57] ABSTRACT

A motion picture decoder uses a synchronous dynamic random access memory (SDRAM) as a frame memory in which the SDRAM is used, to store one frame of a video signal. By using an SDRAM which can operate at high speed, one frame of motion picture data is appropriately recorded in the SDRAM to enable rapid processing and complicated predictions of the motion compensation using the frame memory.

7 Claims, 20 Drawing Sheets

FIG.17A

| CONTROL COMMAND | 1ST | 2ND | 3RD | 4TH |
|---|---|---|---|---|
| PREDICTIVE MACROBLOCK A | R | | | |
| PREDICTIVE MACROBLOCK B | R | R | R | R |
| PREDICTIVE MACROBLOCK C | R | | | |
| PREDICTIVE MACROBLOCK D | R | R+16 | R | R+16 |
| PREDICTIVE MACROBLOCK E | R | R+1 | | |
| PREDICTIVE MACROBLOCK F | R | R | R+1 | R+1 |
| PREDICTIVE MACROBLOCK G | R | R+1 | R+1 | |
| PREDICTIVE MACROBLOCK H | R | R+16 | R+1 | R+16+1 |

FIG.17B

| CONTROL COMMAND | 1ST | 2ND | 3RD | 4TH |
|---|---|---|---|---|
| PREDICTIVE MACRBLOCK A | 0 | | | |
| PREDICTIVE MACRBLOCK B | 0 | 1 | 0 | 1 |
| PREDICTIVE MACRBLOCK C | 1 | 0 | 1 | |
| PREDICTIVE MACRBLOCK D | 1 | 0 | 1 | 0 |
| PREDICTIVE MACRBLOCK E | 0 | 1 | 0 | 1 |
| PREDICTIVE MACRBLOCK F | 0 | 1 | 0 | |
| PREDICTIVE MACRBLOCK G | 1 | 0 | 1 | 0 |
| PREDICTIVE MACRBLOCK H | 1 | | | |

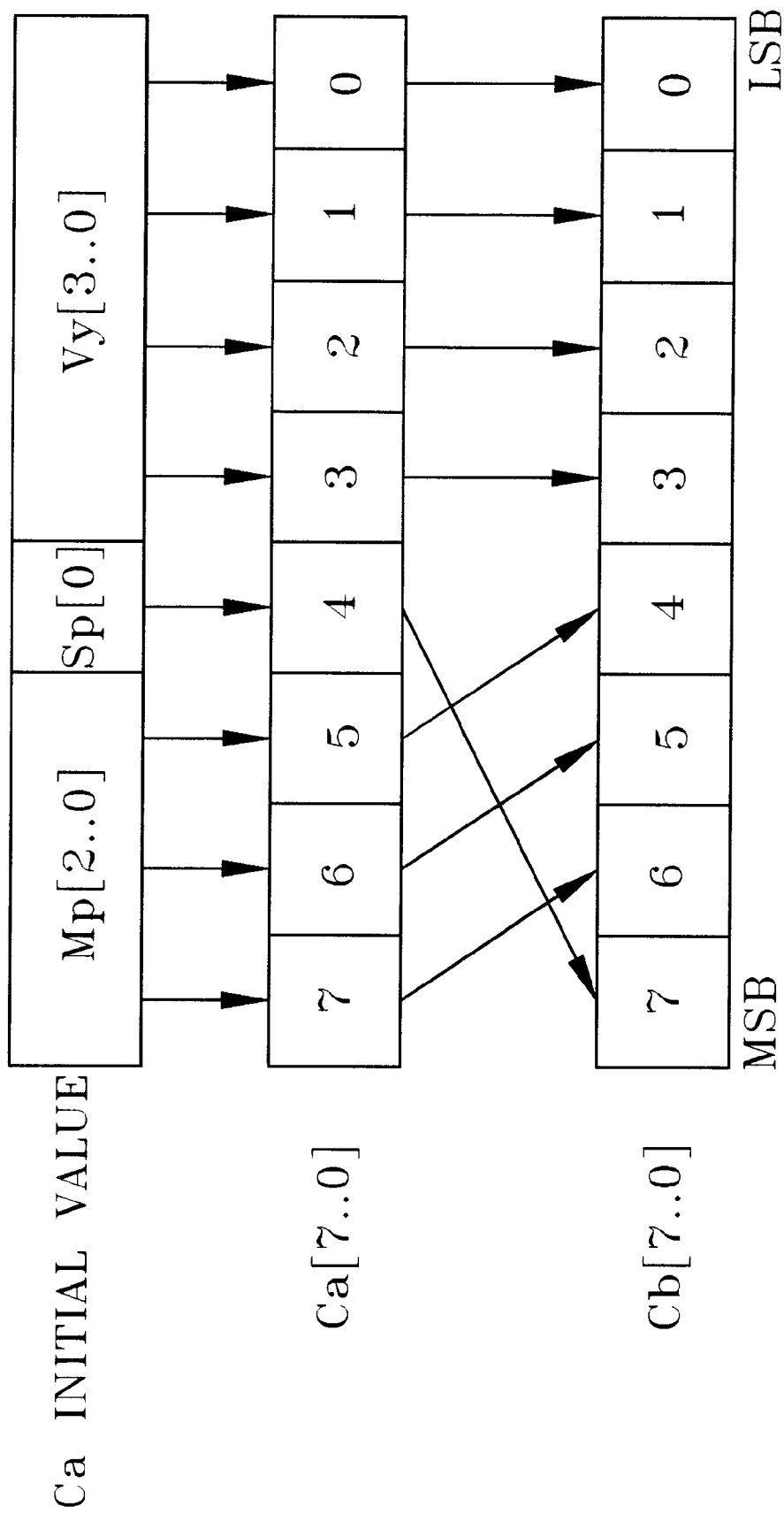

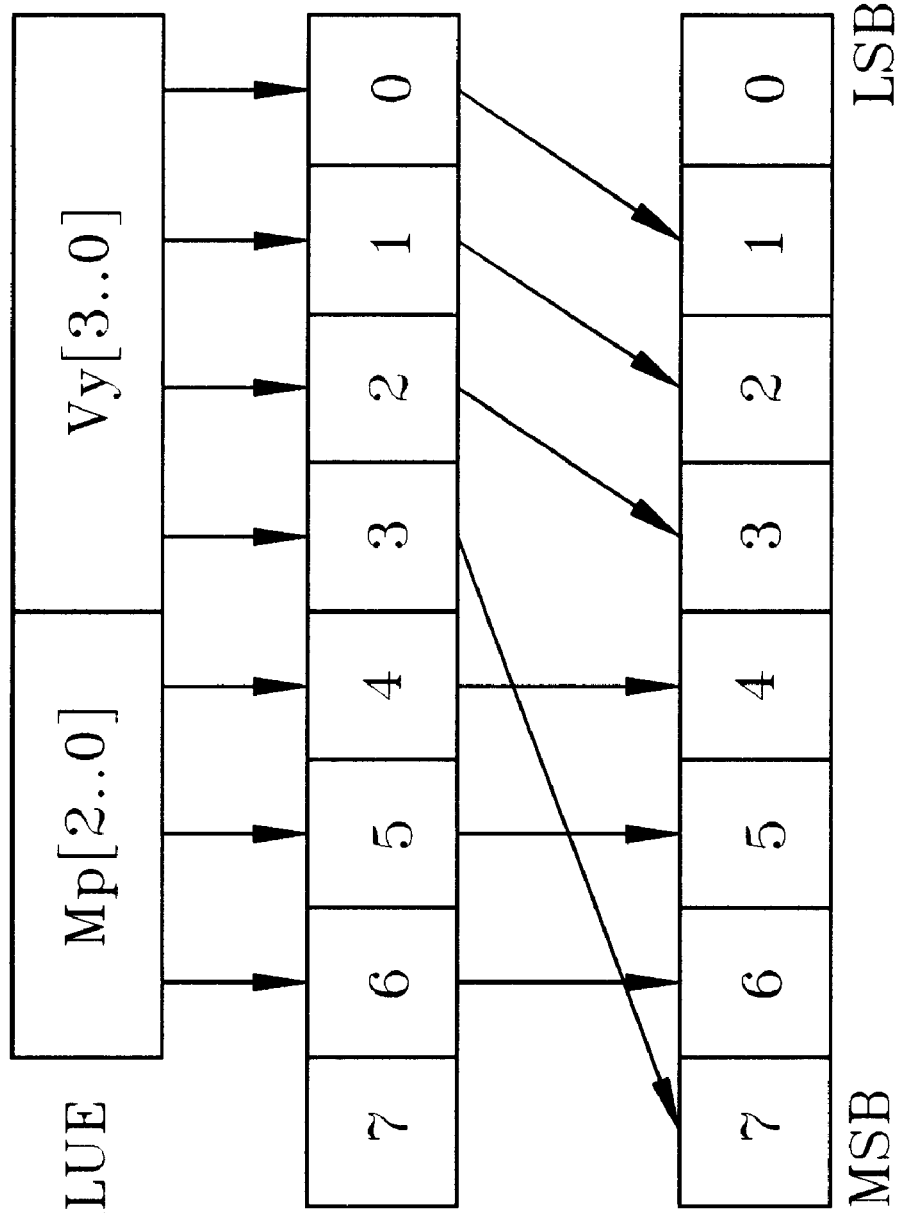

FRAME MEMORY FOR A MOTION PICTURE DECODER

BACKGROUND OF THE INVENTION

The present invention relates to a frame memory for use in a motion picture decoder, and more particularly, to a frame memory which can perform motion compensation at a high speed and in which a synchronous dynamic random access memory (SDRAM) is used to store a reference picture.

Generally, a system such as a high-definition TV or a digital VCR encodes and decodes digital audio and video signals. A video encoder performs orthogonal transformation, quantization, variable-length coding, and motion estimation and compensation coding, on input video signals.

FIG. 1 shows an apparatus for decoding video data encoded by the above video encoder. In the FIG. 1 video decoder, a variable-length decoder 11 variable-length-decodes received encoded data. An inverse quantizer 12 inversely quantizes the variable-length-decoded data. An inverse discrete cosine transformer (inverse DCT) 13 transforms the inversely quantized data into video data having a spatial domain. A motion compensator 14 reads video data of a macroblock corresponding to a motion vector from a frame memory 15 and performs motion compensation with respect to the video data supplied from the inverse DCT 13. The motion compensated video data is output to a downstream block (not shown) and also stored in the frame memory 15 which will be used for subsequent motion compensation. Here, the motion vector is output from the variable-length decoder 11 and is usually supplied from an encoder, together with the encoded video data.

Prediction comprises reading out data of a predictive macroblock designated by a motion vector from the frame memory 15. There are two kinds of prediction. One is a "field prediction" with respect to a reference field picture stored in the frame memory 15, and the other is a "frame prediction" with respect to a reference frame picture stored in the frame memory 15. A picture is classified into a "field picture" which is decoded or encoded in units of a field, and a "frame picture" which is decoded or encoded in units of a frame. Two field pictures, including a top and bottom field, correspond to one frame. The field picture is used only for field prediction and the frame picture is used for both field prediction and frame prediction. To process such prediction without delay, data stored in the frame memory 15, should be swiftly read out. However, as the motion between pictures increases, a larger amount of data should be read out from the frame memory 15. Therefore, it is necessary that a frame memory 15 should swiftly output stored data.

SUMMARY OF THE INVENTION

To solve the above problem, it is an object of the present invention to provide a motion picture decoder which performs motion compensation prediction at high speed by using a SDRAM which operates at a frequency as high as 100 MHz for the frame memory.

It is another object of the present invention to provide a method of recording a one-frame video signal to match the features of an SDRAM.

To accomplish the above objects of the present invention, there is provided a motion picture decoder using an SDRAM as an frame memory.

The objects of the present invention can also be accomplished by providing a method of recording a one-frame video signal on an SDRAM, the video signal recording method comprising the steps of:

disposing 16 vertical lines of a macroblock to 16 horizontal columns in the SDRAM in which a video signal having one horizontal word and 16 vertical lines in the frame video signal is defined as a macroblock;

disposing a one-slice video signal to a domain of 128 columns by N rows (N is a natural number) in the SDRAM, by changing rows of the SDRAM for every eighth macroblock; and disposing every eighth macroblock of 4 slices so that row addresses are identical to each other, by changing a bank of the SDRAM for every second slice.

BRIEF DESCRIPTION OF THE DRAWINGS

The above object of the present invention will become more apparent by detailed descriptions of preferred embodiments thereof with reference to the attached drawings in which:

FIGS. 17A and 17B are tables showing variation of the row and bank addresses of each block shown in FIG. 11.

FIGS. 18A and 18B are views showing the relationship between addresses of the column of the predictive macroblock and that of an actual memory.

DETAILED DESCRIPTION OF THE PREFERRED EMBODIMENT

A preferred embodiment of the present invention will be described in detail below with reference to the accompanying drawings.

Figure 1:
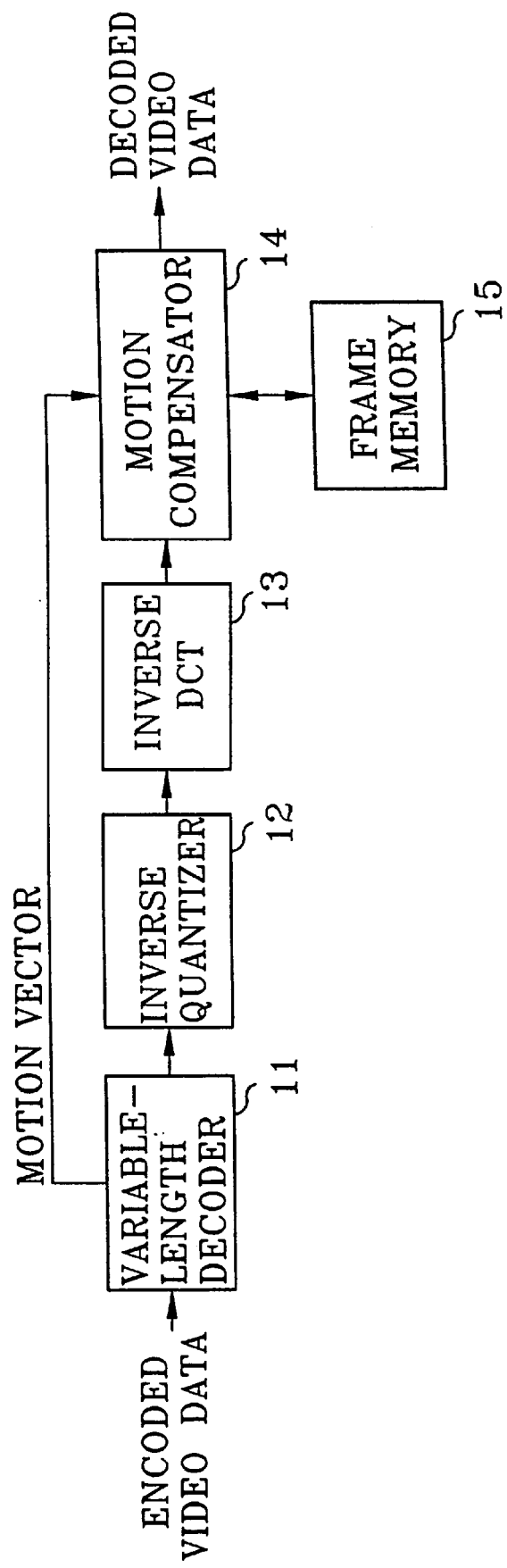
FIG. 1 is a block diagram of a general motion picture decoder.
Figure 2:
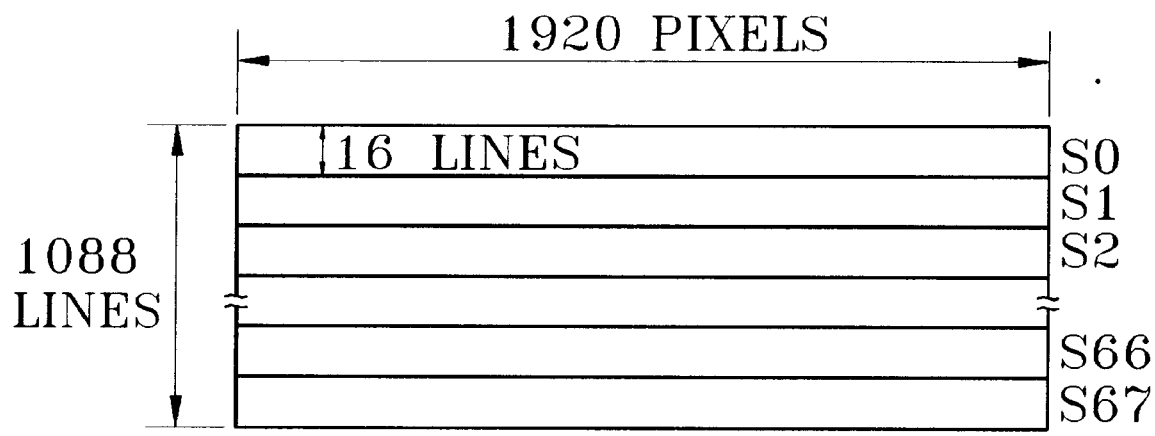
FIG. 2 shows video data of a general frame.
Figure 3:
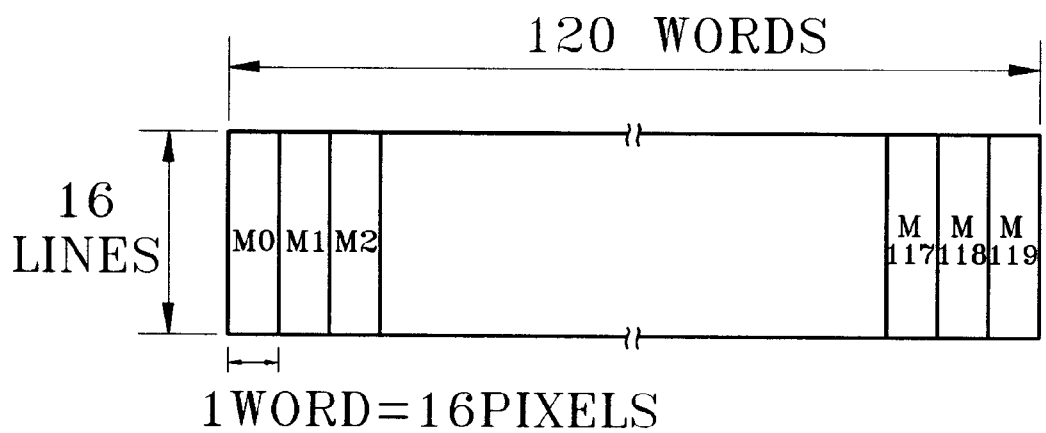
FIG. 3 shows video data of a slice in FIG. 2.

FIGS. 2 and 3 are views for explaining the structure of a frame of digitally encoded video data. In FIG. 2, a frame is composed of 1920 horizontal pixels and 1088 vertical lines, and a slice is composed of 1920 horizontal pixels and 16 vertical lines within the frame. One frame is composed of 68 slices S0–S67. Assuming that 16 horizontal pixels comprise one word, then one macroblock composed of 16 vertical lines by 16 horizontal pixels can be represented as a one horizontal word by vertical 16 lines. Thus, a slice is also described as 120 macroblocks M0–M119 as shown in FIG. 3.

Figure 4:
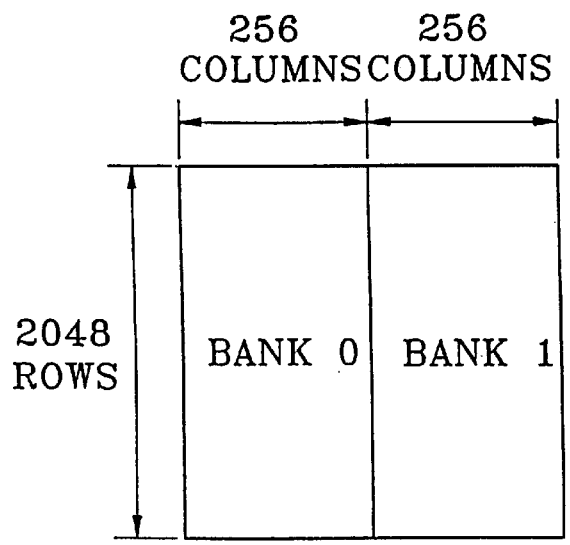
FIG. 4 shows the structure of an SDRAM according to the present invention.

FIG. 4 shows the structure of an SDRAM which is used in the present invention. A main feature of the SDRAM is that all signals operate in synchronization with a clock pulse. Thus, in contrast to other RAMs which operate during an interval of time determined by the pulsewidth of a control signal, the SDRAM generates a control signal for performing a corresponding operation in synchronization with a clock. A frame memory processes data in units of a word, for example, 16 bits in this embodiment. Accordingly, it is possible to construct a frame memory by connecting 8 SDRAMs each having a 16-bit data bus in parallel with each other.

In FIG. 4, the SDRAM is composed of two banks, each of which has 256 columns by 2048 rows. In such an SDRAM, a row address is determined by 11-bit input pins A10~A0, and a column address is determined by 8-bit input pins A7~A0. Also, a bank address is determined by an input pin A11. In the following description, a row address is represented as R[ ], and a column address is represented as C[ ].

Figure 5:
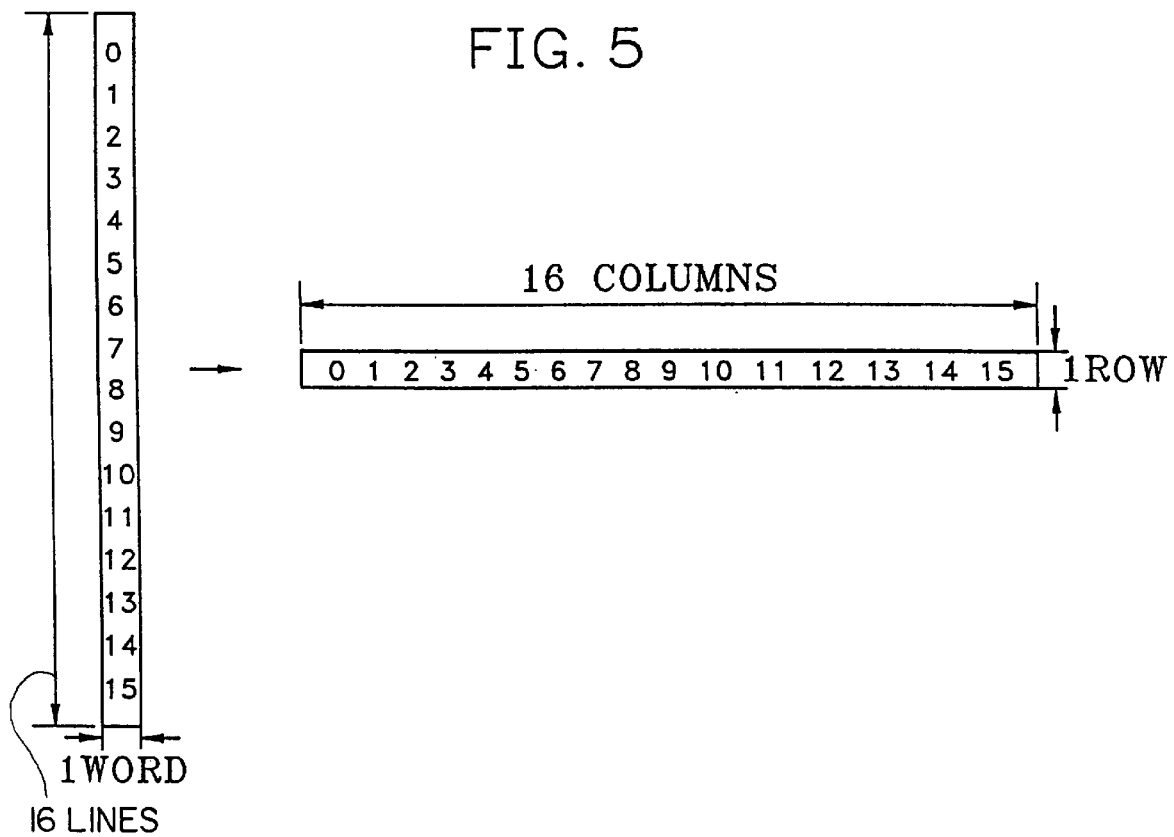
FIG. 5 is a view for explaining a method of disposing video data of a macroblock in the SDRAM according to the present invention.
Figure 6:
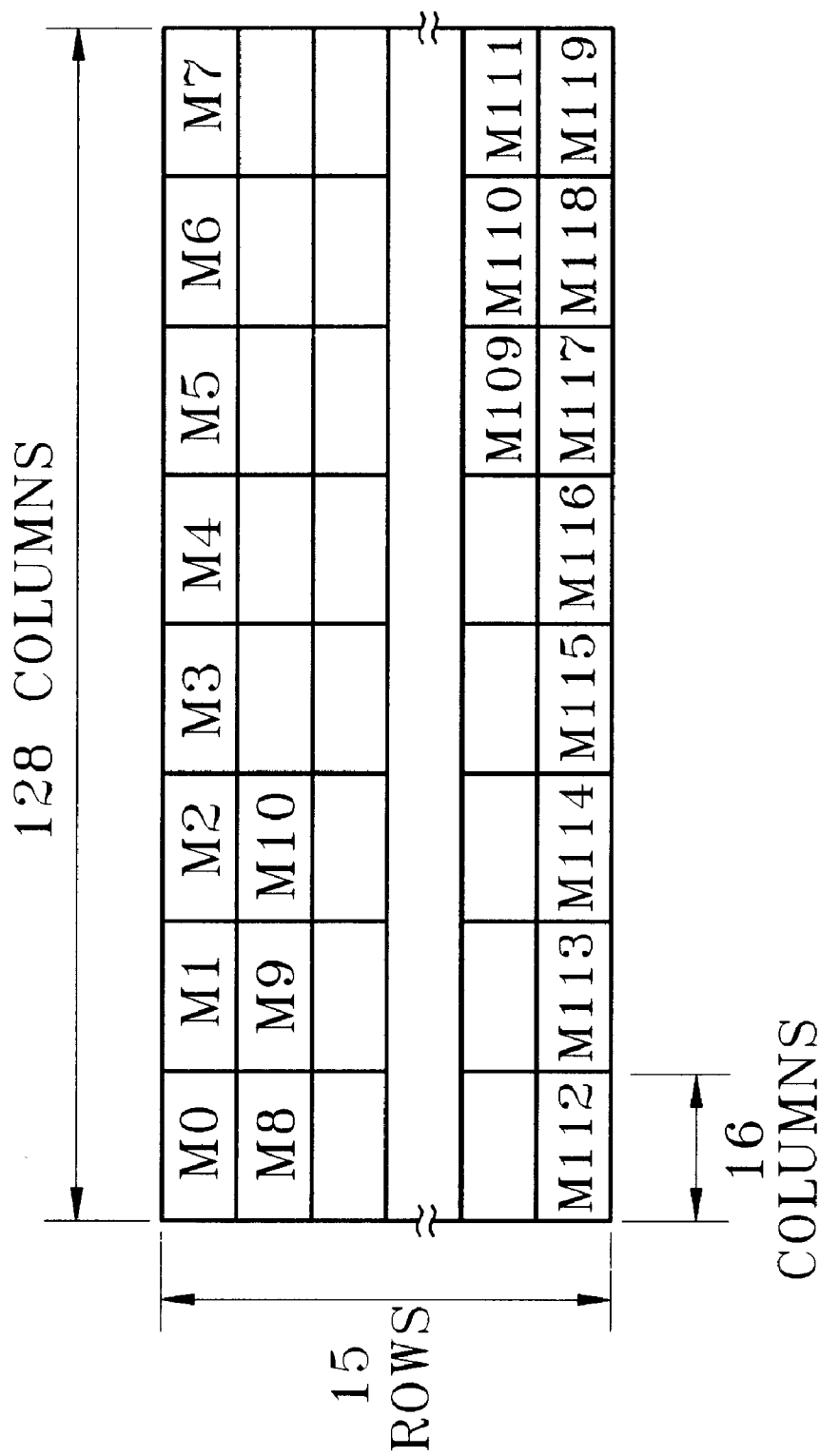
FIG. 6 is a view for explaining a method of disposing video data of a slice in the SDRAM according to the present invention.
Figure 7:
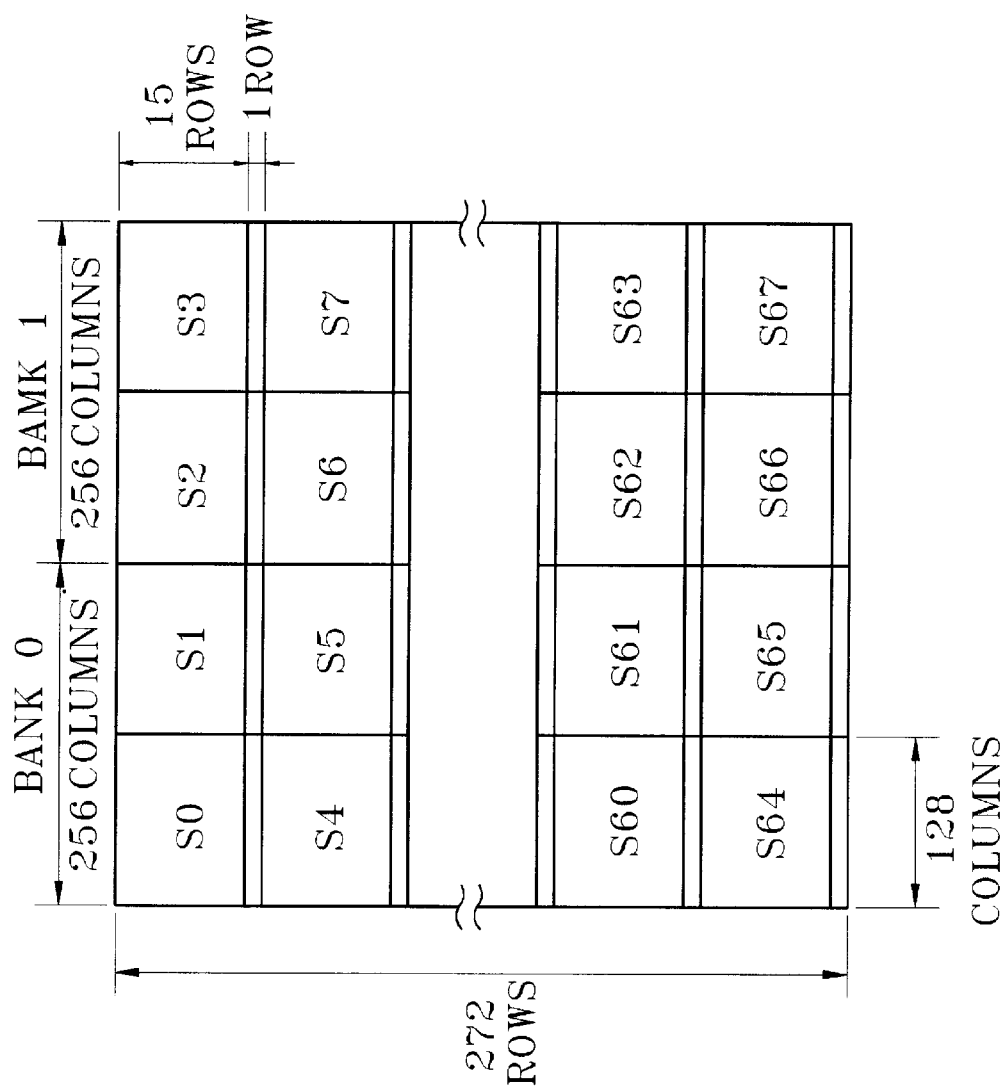
FIG. 7 is a view for explaining a method of disposing video data of a frame in the SDRAM according to the present invention.
Figure 8:
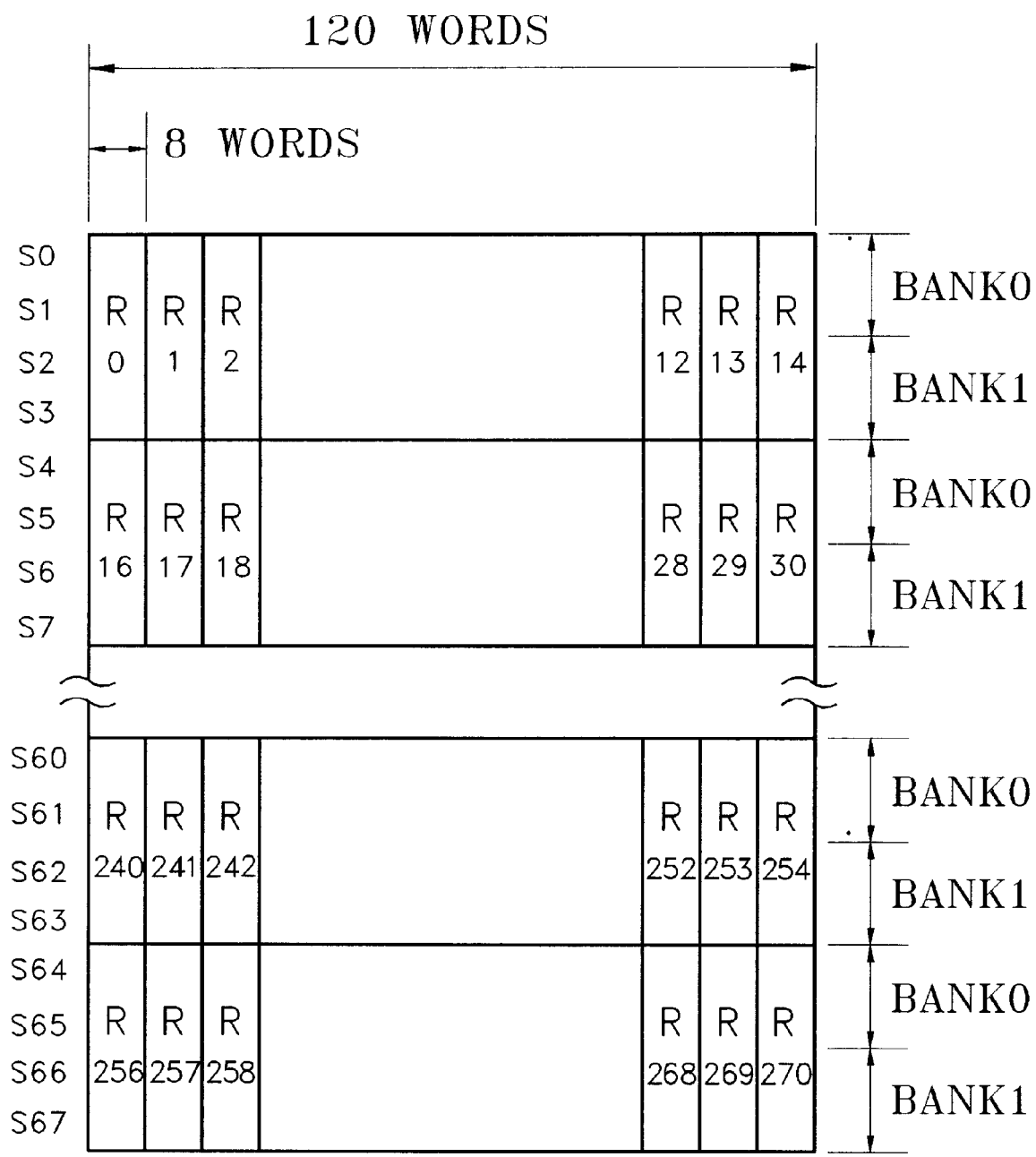
FIG. 8 is a view for explaining a method of disposing video data of a frame in the SDRAM from the viewpoint of data.

FIGS. 5–8 are views for explaining patterns of disposing video data of a frame in the SDRAM according to the present invention. As shown in FIG. 5, a macroblock of the video data which is represented as one word by 16 lines is positioned in 16 horizontal columns by a single vertical row of the SDRAM. To store the video data in the SDRAM, eight successive macroblocks are disposed on the same row, video data of one slice is disposed in 128 columns by 15 rows in the SDRAM as shown in FIG. 6. Two successive slices are positioned on the same bank in the SDRAM. Four successive slices are disposed in 512 columns by 15 rows in the SDRAM. Then, the following successive four slices are spaced one row from the previous four slices. In other words, one row is spaced between every successive four-slice arrangement. Accordingly, 255 row addresses are actually assigned to the one-frame video data among 272 row addresses represented as an equation R=16i+j where i is a natural number 0~16 and j is a natural number 0~14. In other words, the video data having 68 slices S0–S67, i.e., one frame of video data, is disposed to match the size of the SDRAM as shown in FIG. 7. If video data is disposed in the SDRAM as shown in FIG. 7, then eight of the macroblocks contained in each of the four slices have the same row address in the SDRAM. FIG. 7 shows an arrangement of the slices of the video data in the SDRAM, and FIG. 8 shows a relationship between the row address and the word of the SDRAM with respect to the frame of video data. The eight macroblocks having the same row address in FIG. 7 are represented, as eight words having the same row address in FIG. 8.

Figure 9:
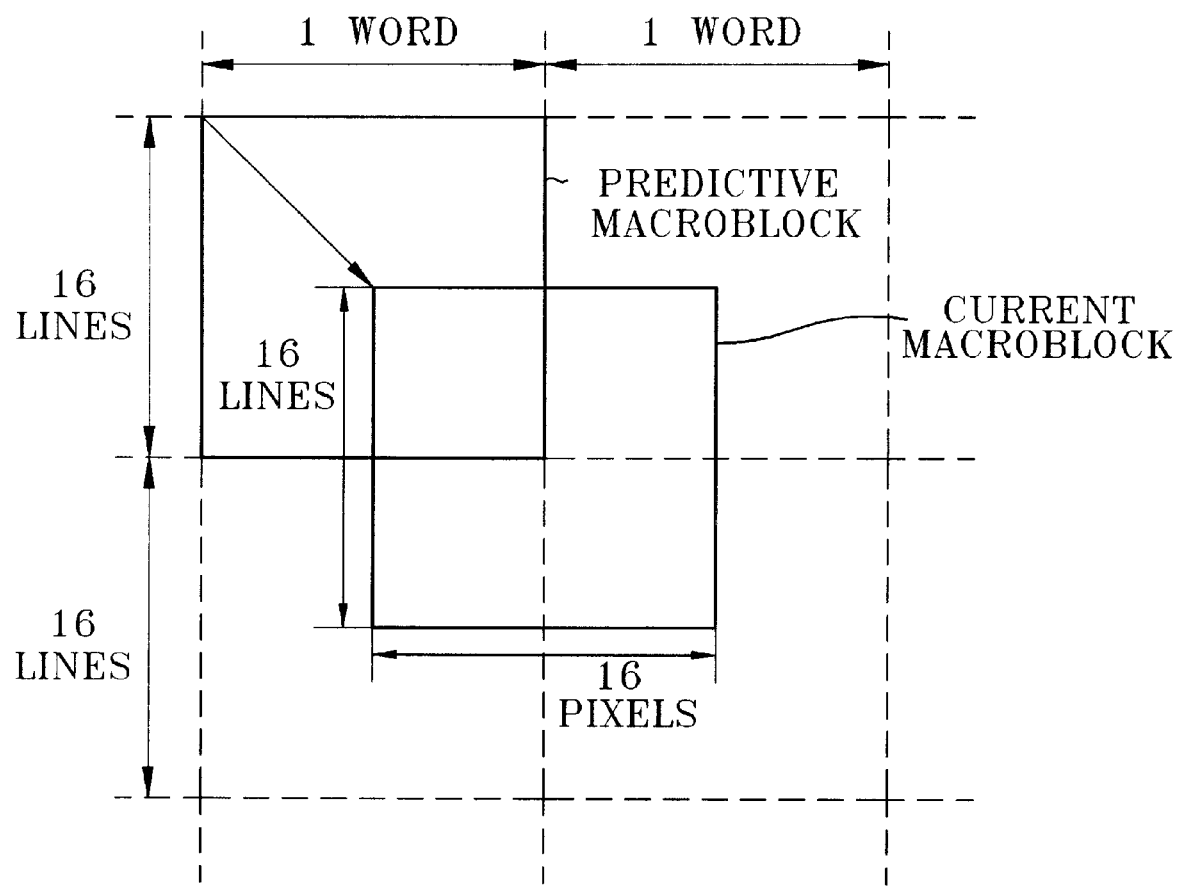
FIG. 9 is a conceptual diagram for explaining a predictive macroblock designated by a motion vector in integer-pixel units.
Figure 10:
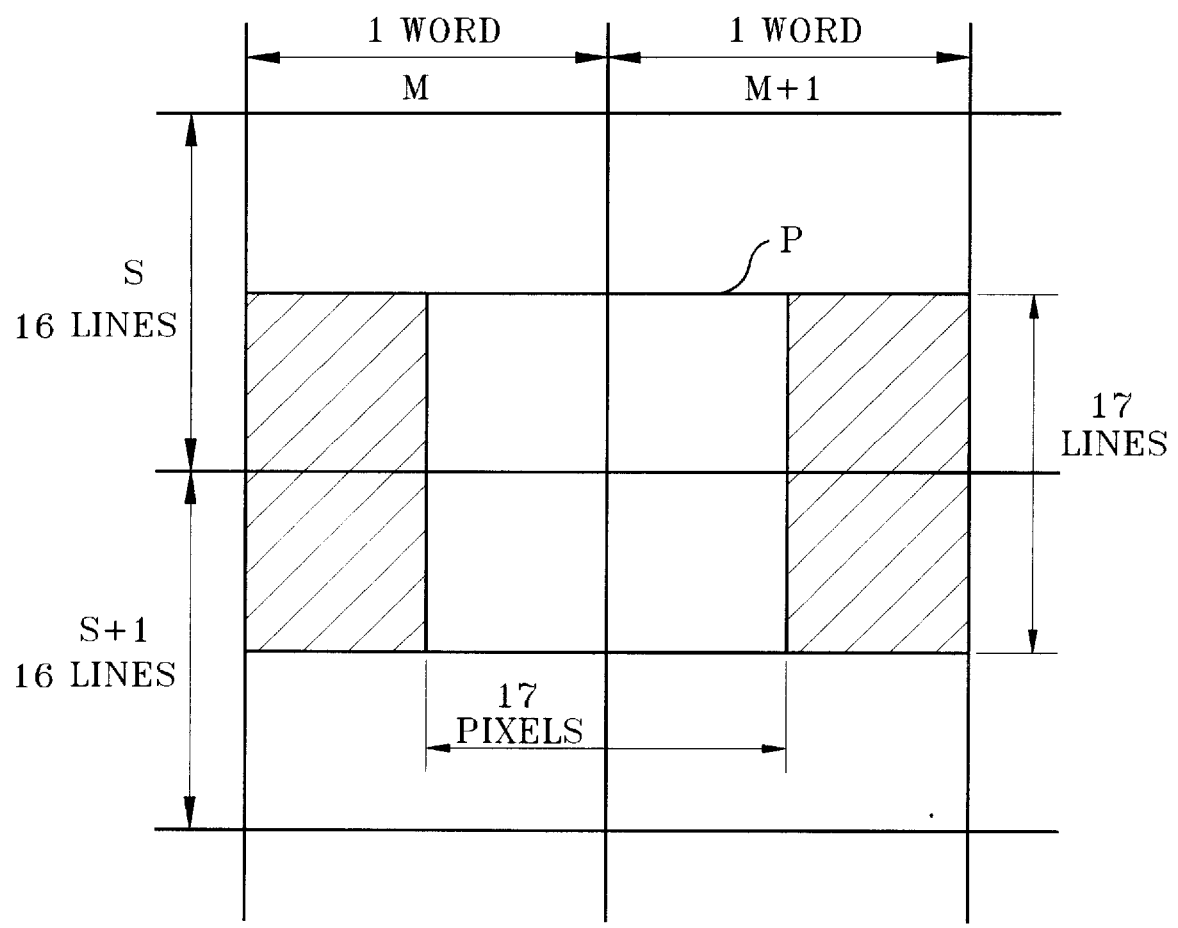
FIG. 10 is a conceptual diagram for explaining a predictive macroblock designated by the motion vector in half-pixel units.

FIG. 9 is a conceptual diagram for explaining a predictive macroblock designated by a motion vector in integer units. In the case when a motion vector is represented by half-pixel units, it is required that a predictive macroblock has video data having one horizontal pixel and one vertical line more than a macroblock having a size of 16 lines by 16 pixels, in performing motion compensation. In this case, the predictive macroblock has a size of two horizontal words and 17 vertical lines as shown in FIG. 10. When the vertical components of the motion vector are constant, and the horizontal components thereof vary in the range of 0~15, a predictive macroblock having a size of 17 lines by 17 pixels is varied within the range of the predictive macroblocks designated by "P" and the neighboring hatched portions in FIG. 10. In this case, the macroblocks used for reading video data from the memory are not varied. Since the motion compensation technique using a motion vector of a half-pixel unit is well known, the detailed description thereof will be omitted.

Figure 11:
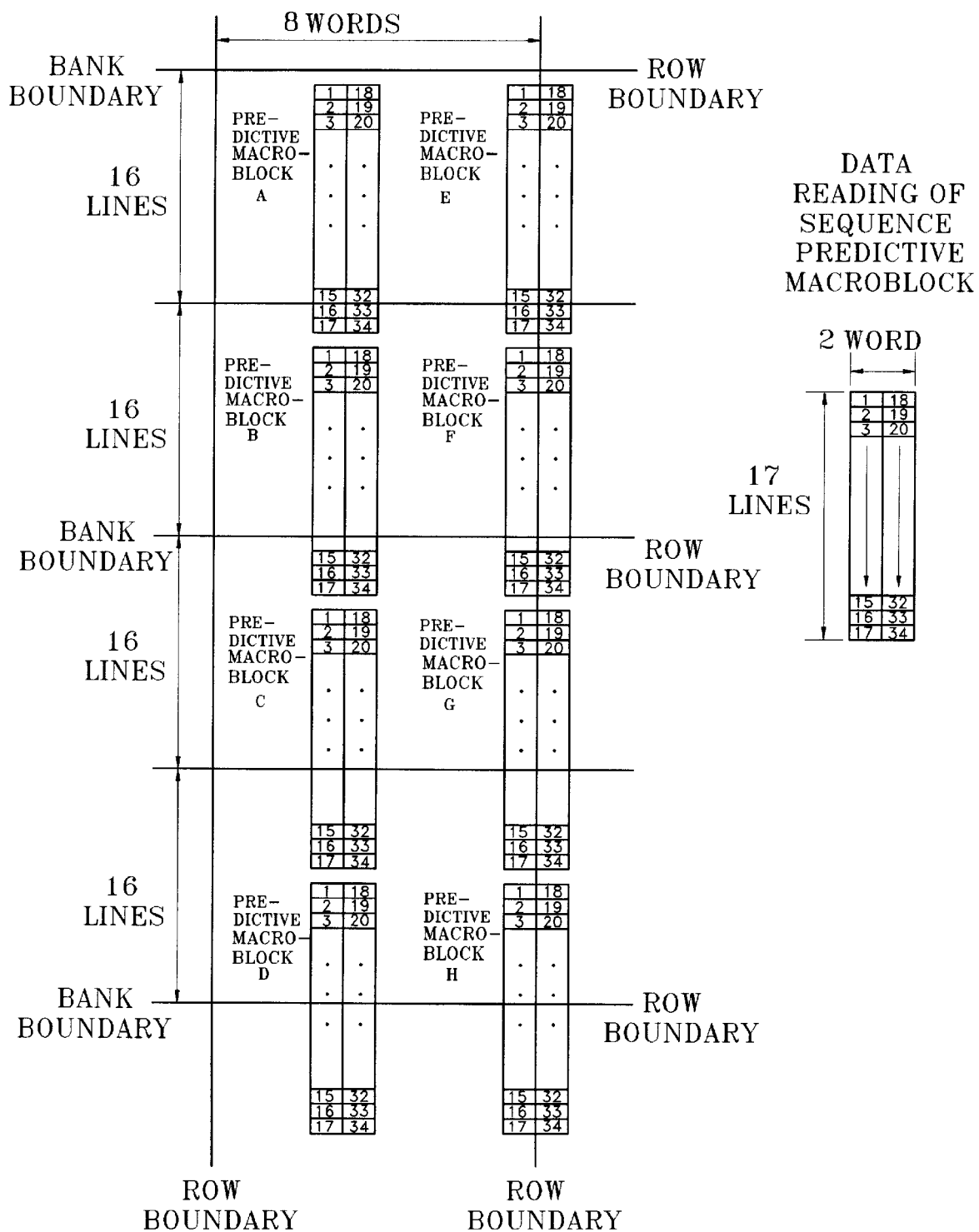
FIG. 11 shows a frame prediction embodiment in the frame picture.
Figure 12:
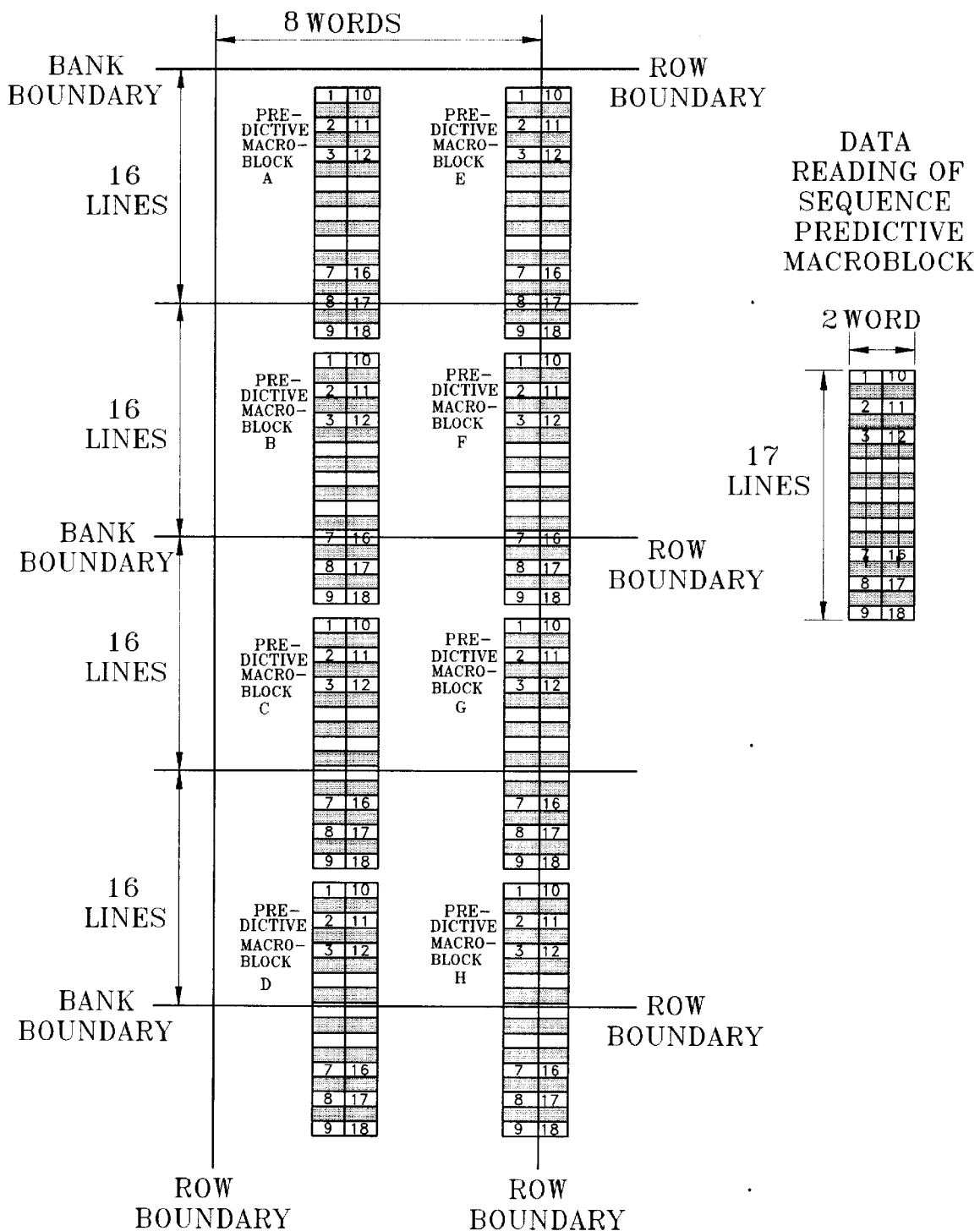
FIG. 12 shows a field prediction embodiment in is the frame picture.
Figure 13:
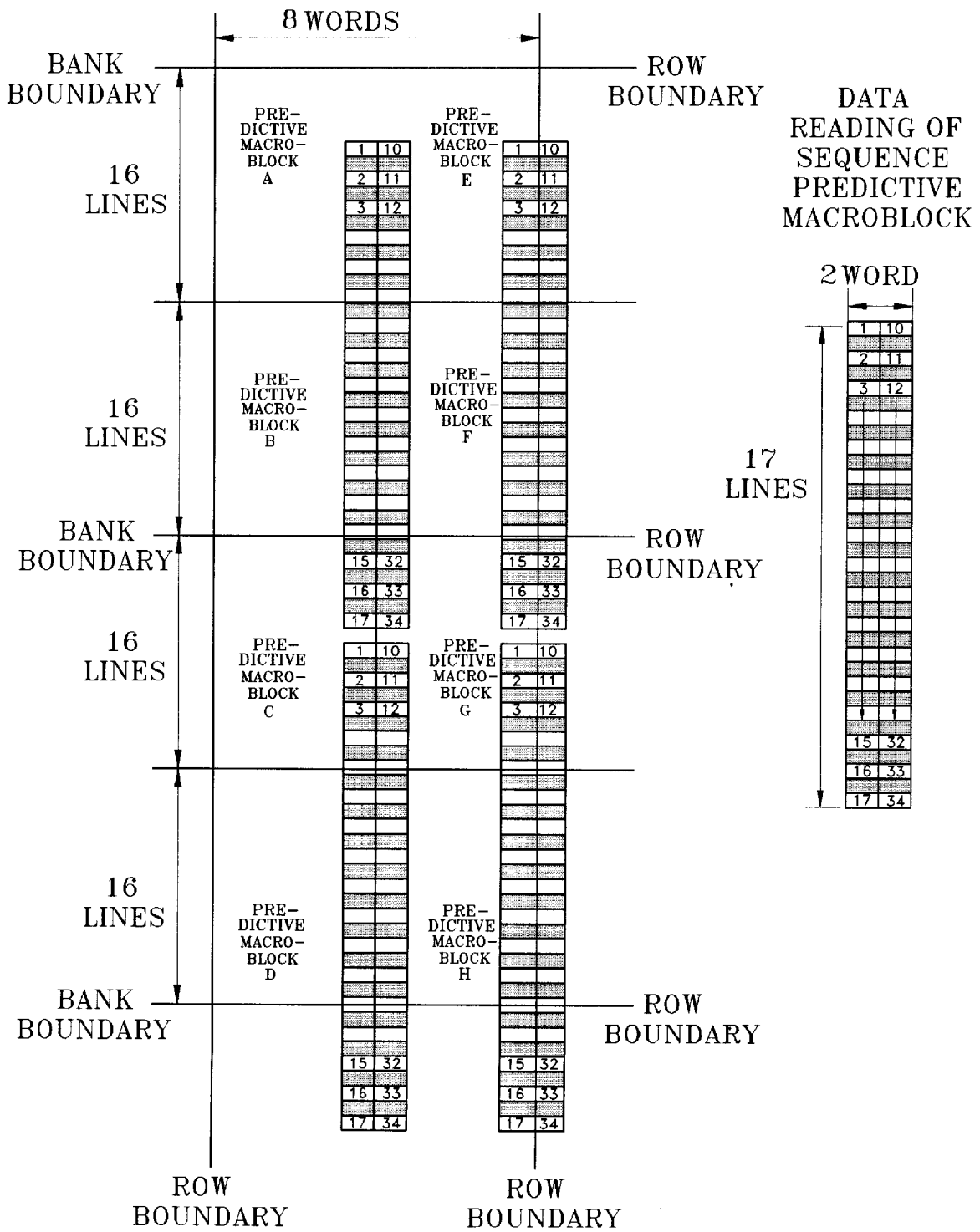
FIG. 13 shows a field prediction embodiment in the field picture.

FIGS. 11–13 are views for explaining a sequence of reading video data stored in the SDRAM in connection with various kinds of prediction. The video data having 8 words by 64 lines shown in FIGS. 11–13 has any one row address in FIG. 8. FIG. 11 shows a possible arrangement of a predictive macroblock with respect to a frame picture used for frame prediction. FIG. 12 shows a possible arrangement of a predictive macroblock with respect to a frame picture used for field prediction. The example of FIG. 12 uses the same frame picture as that of FIG. 11, so that the macroblocks read for prediction are same as the in FIG. 11. However, since prediction is accomplished in units of a field, data is read during every other line. FIG. 13 shows a field prediction embodiment in the field picture. One-slice of the field picture occupies the same memory space as that of two slices of the frame picture. In other words, a single slice of a field picture is disposed in a slice that occupies the same row address and the bank address as two slices of a frame picture shown in FIG. 7. Thus, the video data of two lines with respect to a single word is read 17 times over 34 lines in FIG. 13.

Figure 14:
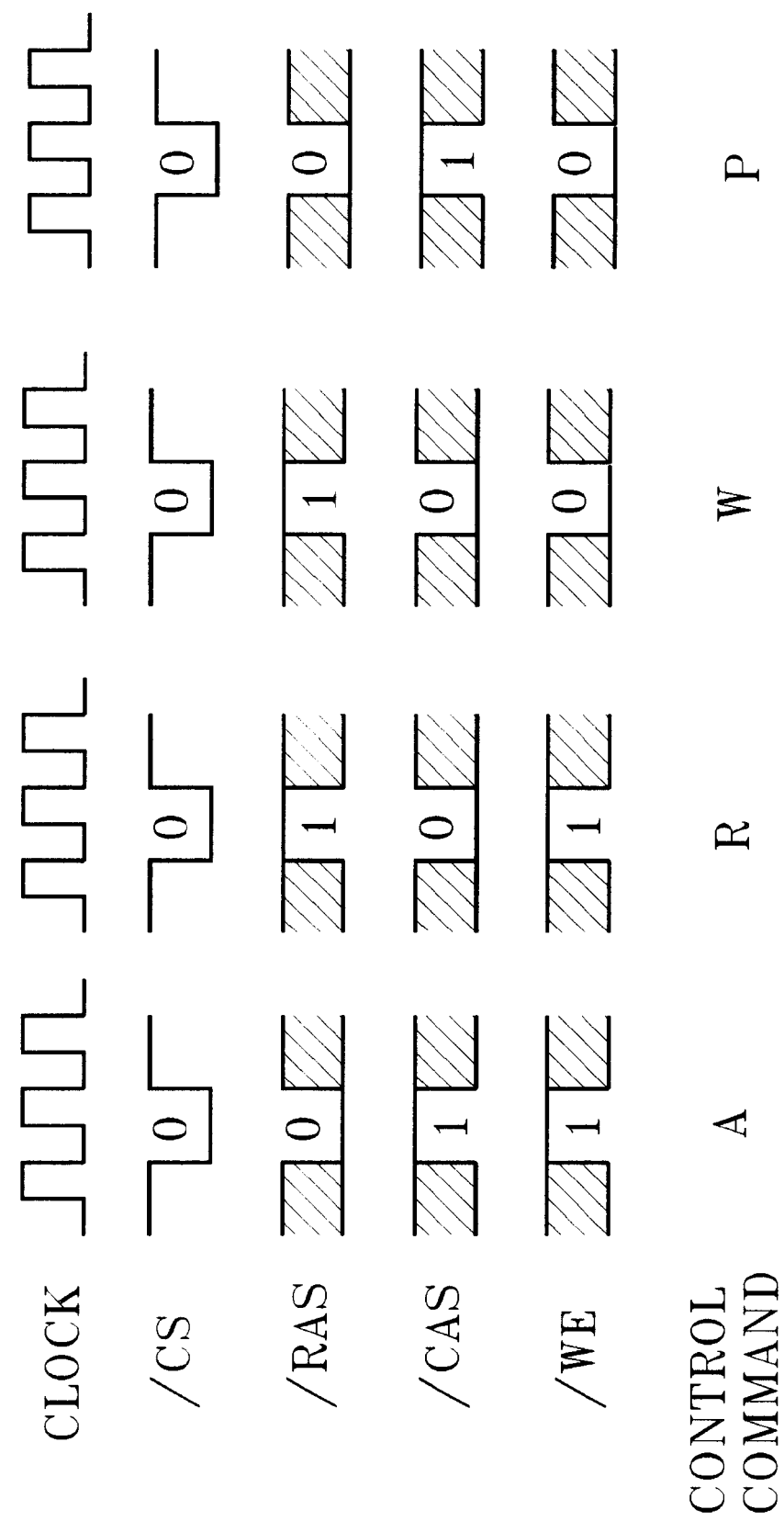
FIG. 14 is a timing diagram showing control commands resulting from combination of control input signals in the SDRAM.

FIG. 14 is a timing diagram showing control commands resulting from a combination of control input signals in the SDRAM. The control input signals are a chip select signal /CS for enabling the SDRAM, a row address strobe signal /RAS and a column address strobe signal /CAS, respectively, representing that an input address is an effective row address and column address, and a write enable signal /WE for recording data in a corresponding address. The control commands, as shown in FIG. 14, include a low active signal (a), a read signal (r), a write signal (w) and a precharge signal (p) comprise a combination of the control input signals. A series of control command signals constituting these control commands is used to control of the SDRAM.

The operations of recording and reading video data to and from the SDRAM using these control command signals will be described below. In the following description, row addresses are represented by the equation R=16i+j described above, and column addresses are represented as an equation C=128k+16l, where k is a natural number 0~3 and l is a natural number 0~7.

Figure 15:
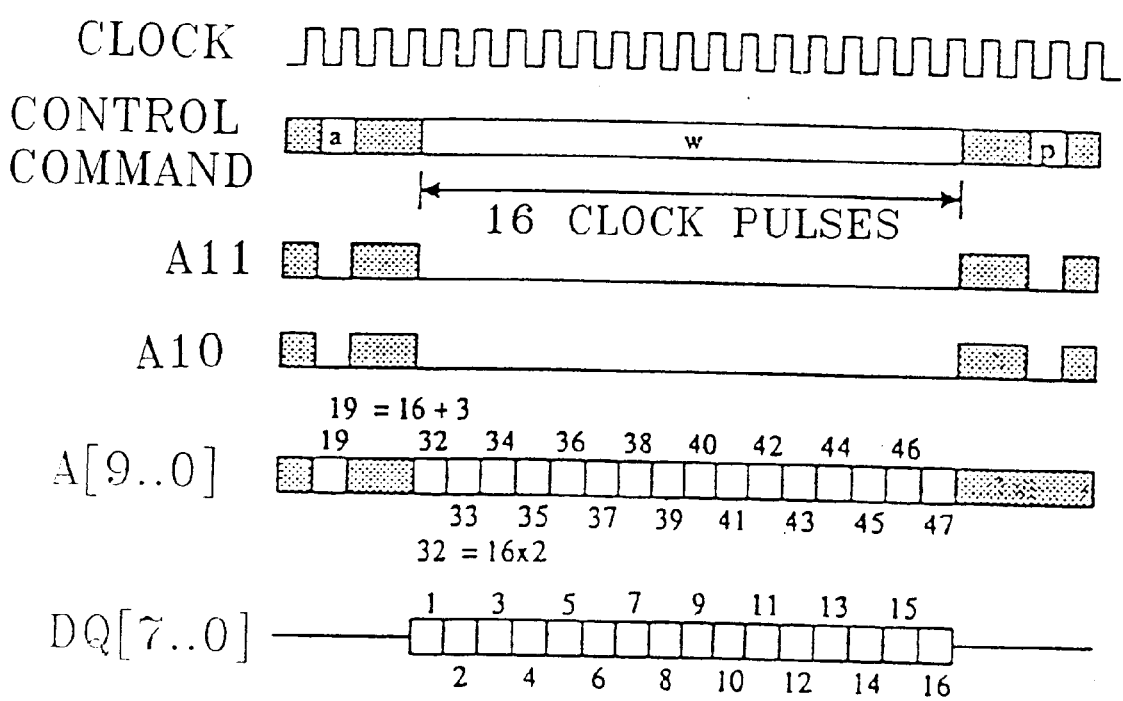
FIG. 15 is a timing diagram for explaining a write operation for writing one macroblock of video data on the SDRAM according to the present invention.

FIG. 15 is a timing diagram for explaining a is write operation for writing motion-compensated macroblock video data on the SDRAM. In FIG. 15, the data of the twenty-seventh macroblock M26 in the fifth slice S4 is written in the position of the memory having the row address of 19 (=16×1+3) and the column address of 32 (=16×2). The one macroblock of video data is synchronized with 16 clock pulses and recorded on the corresponding positions in the SDRAM.

Figure 16A:
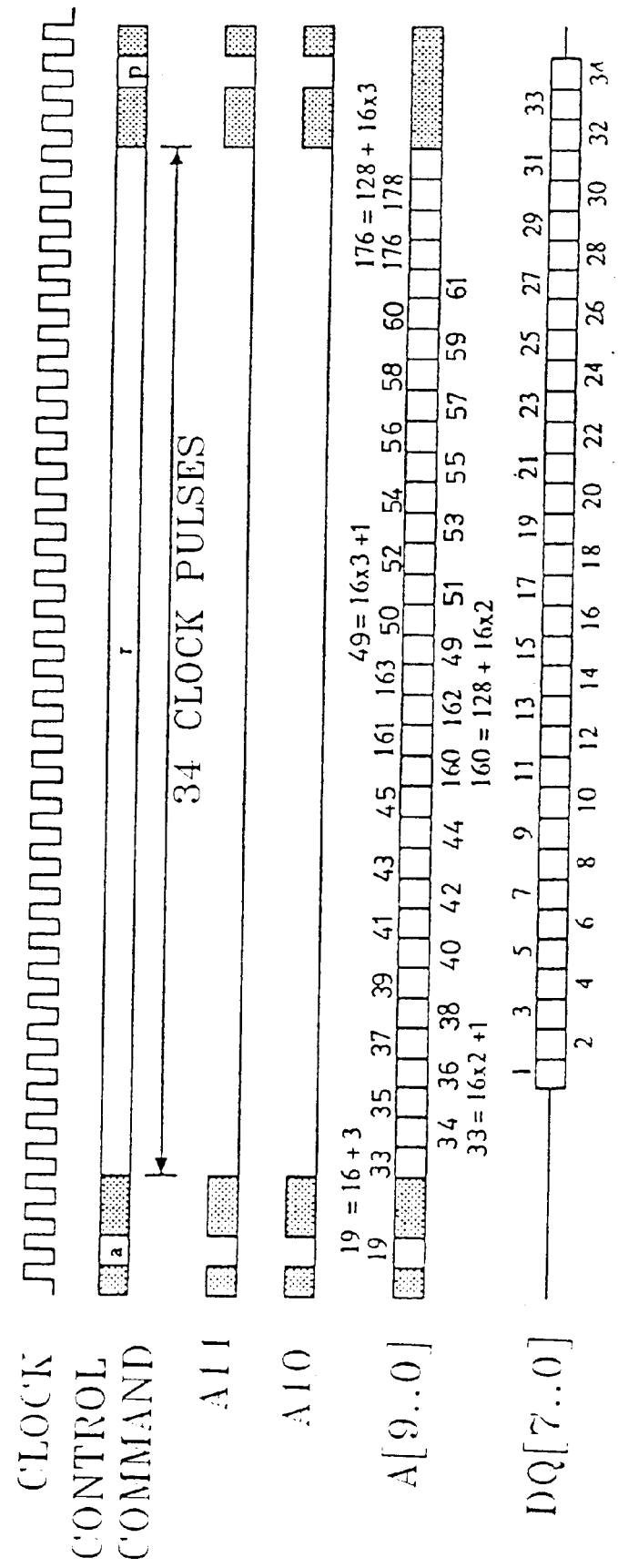
FIGS. 16A–16C are timing diagrams for explaining a read operation of reading a part of predictive macroblocks shown in FIG. 11.
Figure 16B:
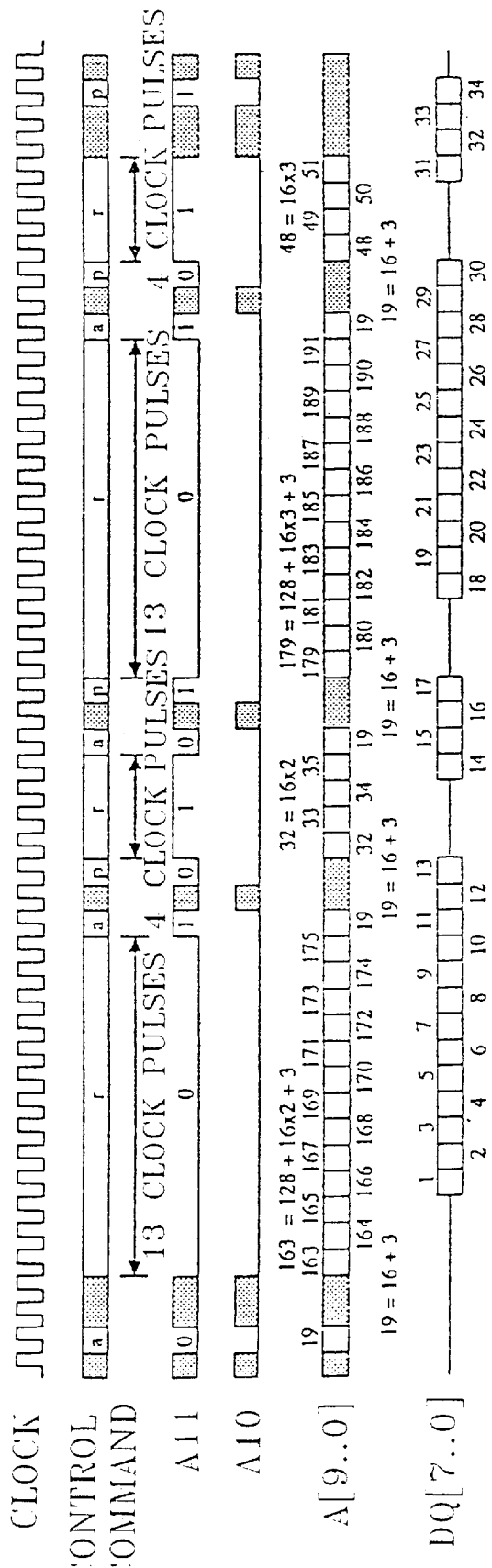
Figure 16C:
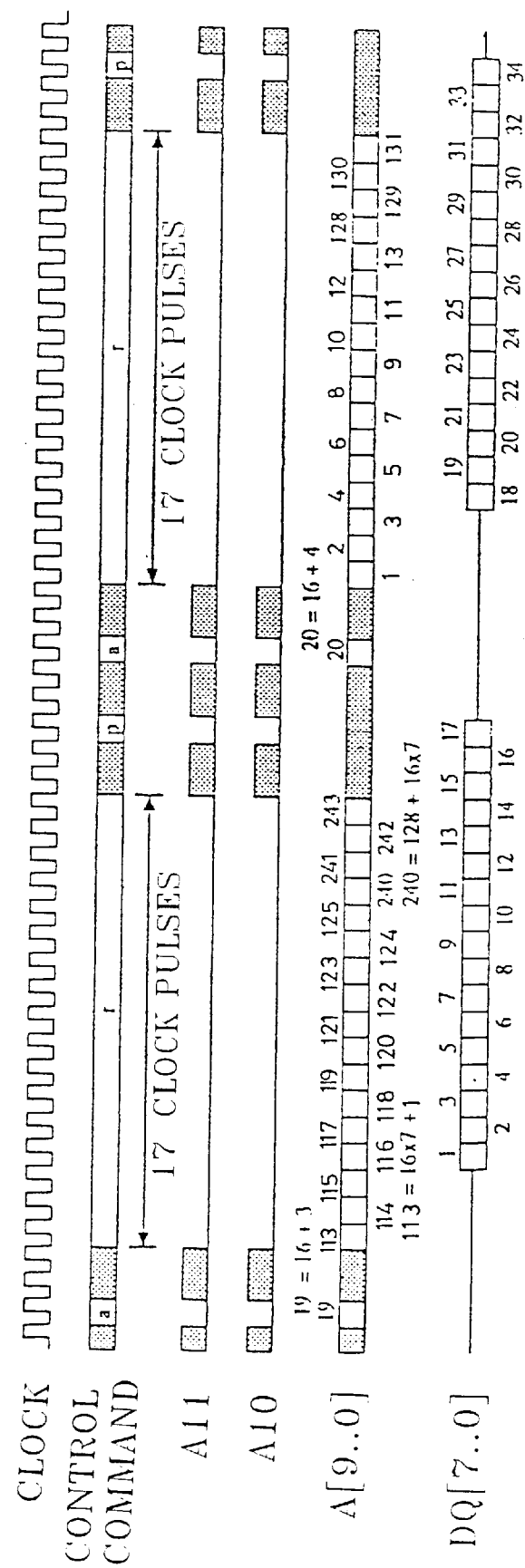

A read operation of reading predictive macroblocks of the video data from the SDRAM will be described with reference to FIGS. 16A–16C. FIG. 16A is a timing diagram for reading a predictive macroblock A shown in FIG. 11. The FIG. 11 predictive macroblock A belongs to reference macroblocks having the same bank and row addresses. Accordingly, 34 data signals DQ[7..0] (17 lines by 2 words) are read during generation of 34 clock pulses using commands such as a low active signal (a), a write signal (r) and a precharge signal (p) shown in connection with the predictive macroblock A in FIGS. 17A and 17B. Here, the first column address of the first read reference macroblock becomes 33 (=16×2+1). The data of the sixteenth line in the predictive macroblock A belongs to a slice different from that of the fifteenth line. Thus, the column address of the sixteenth data becomes 160 (128+16×2) not 46. If the sixteenth and seventeenth line data is completely read, then the following word belonging to the predictive macroblock A is read. To read this data, the column address becomes 49 (=16×3+1). FIG. 16B is a timing diagram for reading the predictive macroblock B of FIG. 11. The predictive macroblock B of FIG. 11 has one row address and two bank addresses as shown in FIGS. 17A and 17B, whose start column address becomes 163 (=128+16×2+3). Then, when the fourteenth word data belonging to the predictive macroblock B is read, the bank address is changed to thereby start to read data starting from data having the column address of 179 (128+16×3+3). When data of the line whose bank address is changed within the same predictive macroblock is read, as in the data of the fourteenth line in the predictive macroblock B, the memory having a structure of a single bank reads 13 data signals and then requires the command of a low active signal (a) to read data starting from the data of the fourteenth line after receiving the command of a precharge signal (p). However, the present invention uses a SDRAM having two banks, to thereby send a command of a low active signal (a) for reading data recorded in the second bank during duration of the empty clock pulse between the read signal (r) and the precharge signal (p). In other words, with the dual bank structure, is when the bank changes, the time consumed when data is read and written can be saved. FIG. 16C is a timing diagram for reading the predictive macroblock E of FIG. 11. The predictive macroblock E of FIG. 11 has different row addresses in two words as shown in FIGS. 17A and 17B. Therefore, the commands such as the low active signal (a), the read signal (r) and the precharge signal (p) are required for reading each word. Since the operation of reading the data belonging to the predictive macroblock E is understood by a person skilled in the art through the above described examples, the detailed description for reading macroblock E will be omitted. The above-described examples of FIGS. 16A–16C use the SDRAM which is designed in such a manner that a column address strobe signal /CAS lapses by three clock pulses before a data processing becomes effective.

FIGS. 17A and 17B are tables showing variation of the row and bank addresses of each predictive macroblock shown in FIG. 11. FIG. 17A shows variation of the row addresses with respect to the control command (a). FIG. 17B shows variation of the bank addresses with respect to the control commands (a), (r) and (p). Here, R represents a row address where a reading operation starts in the predictive macroblock. The predictive macroblock H of FIG. 11 has two words having different row addresses and in which the bank address is changed in the middle of the predictive macroblock. If a row address starting to read the predictive macroblock H is "R", when the bank address is changed from "1" to "0," the second commands (a), (r) and (p) are generated. In this case, the row address becomes "R+16". If the bank address is changed again into "1," the third commands (a), (r) and (p) are generated, in which case the row address becomes "R+1" which is one larger than the first row address "R". Then, if the bank address is changed into "0," the fourth control commands (a), (r) and (p) are generated in which case the row address becomes R+16+1.

If a row address is R[10..0], the row address in the frame prediction is as follows.

R[10..0]=Fp[10..0]+Sp[6..2]×16+Mp[6..3]

Here, Fp represents a predictive frame address. Sp represents a predictive slice address and Mp represents a predictive macroblock address, which are expressed as the following equations.

$$Sp[\ ]=Sc[\ ]+Vy[7..4], \text{ and}$$

$$Mp[\ ]=Mc[\ ]+Vx[7..4].$$

Here, Sc[ ] and Mc[ ] represent the current slice address and the current macroblock address, respectively. Vx[ ] and Vy[ ] represent motion vectors of the horizontal and vertical components, respectively. The row is changed in units of the eight macroblocks. Thus, the row address is not influenced when the number of the macroblocks is less than eight. Also, the set of rows is changed in units of the four slices, in which case the row address is not influenced when the number of the slices is less than four. The Sp[1], which is among the bits which are not used in the slice address, are used with the bank address. The Sp[0] and Mp[2..0], which are also not used in the above-description, are used as the column addresses. Designation of column addresses will be described with reference to FIGS. 18A and 18B.

In case of field prediction, the row address is as follows.
R[10..0]=Fp[10..0]+Sp[5..1]×16+Mp[6..3]

FIGS. 18A and 18B are views showing how addresses of the column of the predictive macroblock correspond to those of an actual memory. FIG. 18A illustrates the case of the frame prediction. The column address of the predictive macroblock comprises eight bits, in which the four lower bits are used as the lower bits Vy[3..0] of the vertical motion vector. The fifth bit from the least significant bit (LSB) is used as the LSB sp[0] of the predictive slice address, and the three higher bits are used as three lower bits Mp[2..0] of the predictive macroblock address. Ca is a counter value in which an initial column address of the predictive macroblock is received and the counter value increases by one for every clock pulse at the interval of the control command (r). Also, Cb represents a column address of the actual memory corresponding to the counter value Ca. The fact that the column address of the actual memory is not equal to the counter value which increases by one, is due to the above-described video signal arrangement method according to the present invention. That is, if the vertical motion vector becomes more than 16 lines resulting from incrementing the counter value by one, the slice address is varied. Then, after reading one word, the macroblock address increases by eight. However, the column address assigned to the actual memory changes the slice address after eight macroblocks, corresponding to a 16 line lapse. Taking the FIG. 11 predictive macroblock A as an example, the sixteenth data is read in synchronization with the sixteenth clock pulse. In other words, the data of the 16 lines of one word is read when the counter value Ca is 16. However, the actual column address of the sixteenth line becomes one after the eight macroblocks lapse from the column address of the fifteenth line. Thus, the counter is required for making the initial value of the column address correspond to that of the actual memory. FIG. 18B shows how the column address of the predictive macroblock during the field prediction corresponds to that of the actual memory. As described with reference to FIGS. 11 and 13, one slice of the field picture is assigned to the same memory region as that of two slices of the frame picture. Thus, in case of the field picture, the boundary of the slice is the same as that of the bank, which does not require the predictive slice address Sp[ ] shown in FIG. 18A. If the vertical motion vector becomes larger than 16 lines, the bank address is changed. Then, the least significant bit Cb[0] in the column address of the memory is used for discriminating a top field and a bottom field.

In the above-described embodiment of the present invention, one word is defined as horizontal 16 pixels of the one-frame. However, it is possible to constitute one word with two, four or eight pixels.

As described above, the frame memory in the motion picture decoder according to the present invention is embodied using an SDRAM which can operate at high speed, in which the one frame of motion picture data is appropriately disposed in the SDRAM to thereby enable rapid processing complicated predictions of the motion compensation using a frame memory.

While only certain embodiments of the invention have been specifically described herein, it will apparent that numerous modifications may be made thereto without departing from the spirit and scope of the invention.

What is claimed is:

1. A method of recording a frame of a video signal on a synchronous dynamic random access memory (SDRAM) said video signal comprising a plurality of macroblocks of one word length and of 16 vertical lines, the video signal recording method comprising the step of:

disposing the 16 vertical lines of each of said plurality of macroblocks to 16 horizontal columns in the SDRAM.

2. The method of recording a frame of a video signal on a synchronous dynamic random access memory (SDRAM) according to claim 1, wherein said video signal comprises a plurality of slices which include a plurality of macroblocks, said method further comprising the step of assigning a slice of the video signal to a domain of 128 columns by N rows (N is a natural number) in the SDRAM by assigning a next row of said N rows of the SDRAM for every eighth macroblock in each of said plurality of slices.

3. The method of recording a frame of a video signal on a synchronous dynamic random access memory (SDRAM) according to claim 2, further comprising the step of assigning an identical row address for eight macroblocks in each of four slices by assigning a bank of the SDRAM for recording every second slice.

4. The method of recording a frame of a video signal on a synchronous dynamic random access memory (SDRAM) according to claim 1, wherein said one word comprises two, four, eight or sixteen horizontal pixels.

5. The method of recording a frame of a video signal on a synchronous dynamic random access memory (SDRAM) according to claim 3, wherein the assignment of the slices to the banks comprises alternately assigning said every second slice to one of two banks in the SDRAM.

6. The method of recording a frame of a video signal on a synchronous dynamic random access memory (SDRAM) according to claim 1, wherein row addresses for recording said macroblocks are determined according to the equation:

$$R = 16i + j$$

where $0 \le i \le 16$ and $$0 \le j \le 14.$$

7. The method of recording a frame of a video signal on a synchronous dynamic random access memory (SDRAM) according to claim 6, wherein column addresses for recording said macroblocks are determined according to the equation:

$$C = 128k + 16l,$$

where $0 \le k \le 3$, and $$0 \le l \le 7.$$

* * * * *